United States Patent [19] [11] 3,883,098
Hermann et al. [45] May 13, 1975

[54] ARRANGEMENT FOR GUIDING TOGETHER OF TWO TRAFFIC STREAMS

[75] Inventors: Walter Hermann, Weissenfeld; Peter Kraus, Munich; Günter Steinmetz, Grafing, all of Germany

[73] Assignee: Messerschmitt-Bolkow-Blohm GmbH, Munich, Germany

[22] Filed: Sept. 5, 1973

[21] Appl. No.: 394,469

[30] Foreign Application Priority Data
Sept. 6, 1972 Germany............................ 2243679

[52] U.S. Cl............................ 246/167 R; 104/149
[51] Int. Cl.................................................. B61l 3/00
[58] Field of Search........ 246/167 R, 167 D, 187 C; 104/149; 340/31 R, 36

[56] References Cited
UNITED STATES PATENTS
3,263,625 8/1966 Midis et al............................ 104/88
3,593,262 7/1971 Spencer.................................. 340/36
3,796,871 3/1974 Helmcke et al.................. 246/167 R Primary Examiner—M. Henson Wood, Jr.
Assistant Examiner—Reinhard J. Eisenzopf
Attorney, Agent, or Firm—Woodhams, Blanchard and Flynn

[57] ABSTRACT

A system is described which enables two streams of discreet objects to flow together into a single stream thereof without interference between said objects. In a system enabling two streams of discreet objects, such as passenger-carrying, track-guided vehicles, to flow together into a single stream thereof without interference between same, the vehicles are caused to travel along especially attenuated lines. Thus, a signal induced in such lines at one given point will be attenuated at such a sufficiently steep gradient that a measurement thereof at a point spaced along said line from the point of origin will provide an accurate indication of the distance of the point of measurement from said point of origin. Thus, of a pair of vehicles on the same track the leading one can emanate a signal and supply same to said conductor and the following one can receive said signal and determine accurately its distance from said leading vehicle. Where two tracks are merged the same effect can be obtained with the leading vehicle on one track and the following vehicle on the adjacent track. Such signals can be utilized to insure that the following vehicle will not enter the point of intersection until the leading vehicle is safely through and out therefrom.

16 Claims, 8 Drawing Figures

ARRANGEMENT FOR GUIDING TOGETHER OF TWO TRAFFIC STREAMS

FIELD OF THE INVENTION

The invention relates to an arrangement for guiding together two unidirected, single-track traffic streams by interpositioning of objects movably mounted on each thereof and wherein prior to the approach by each object to a point of confluence there are created gaps between said objects of the traffic streams, said gaps then being occupied at the confluence point by the respective objects arriving there.

BACKGROUND OF THE INVENTION

Higher transporting outputs at favorable traveling speeds are increasingly demanded from short-distance railroads and city railroads. These two conditions can be met simultaneously, however, only by close-together occupancy of the individual track sections. Thus the safe sequencing of the conveyances (objects) has a special importance.

If sequential times of a few seconds are desired (in the case of tracks with so-called individual means of communication), then acceptable safe sequencing is no longer available in the usual manner, like through block arranged light signal systems or also so-called linear influencing systems. Because then each object must regulate itself substantially independently of selected reference points of the track, its speed and its distance from a preceding object is dependent on the speed of such object. A basic condition for such a mode of operation is that each object should be informed constantly, rather than only at certain reference points, of its distance from the respective object in front of it. It has accordingly already been suggested that a communication system (U.S. Pat. No. 3,836,770), the objects of which are equipped with transmitters and receivers, can transmit an electrical signal of a defined amplitude sent out through a transmitter of the leading object, by means of a (special) damped medium, in which the amplitude of the signal is reduced in a defined manner as a function of the distance from the transmitter to the receiver of the next following object, which receiver has a defined sensitivity. As such medium, there is herein used advantageously a homogeneous electrical line which is attenuated so steeply that the amplitude of a signal which is coupled from a transmitter into the line is reduced measurably even on a short line section (for example of a one meter length). Thus, the amplitude of the signal can at the location of a receiver be used as a measurement indicating the distance between transmitter and receiver or between two associated objects. Each object is thus informed continuously by its receiver (having a defined sensitivity) concerning its distance from the respective preceding object as long as its transmitter couples a signal (of defined amplitude) into the damped line.

A different problem in realizing small sequence times exists in guiding together streams of traffic at confluence points smoothly, that is without excessive delays or stops of individual objects or to interposition the objects of one traffic stream into a main traffic stream. To solve this problem an arrangement is already known (U.S. Pat. No. 3,593,262) by means of which, prior to a confluence point between the objects of one traffic stream, gaps can be created in order to occupy same at the confluence point with objects of a second (subordinate) traffic stream. Starting from this, an arrangement is furthermore known for guiding together of two unidirected, single-track traffic streams by interpositioning (U.S. Pat. No. 3,796,871), which in a zone in front of a merge point provides a signaling in each traffic stream of the objects of the other traffic stream and to thereby detect the respective signaled object from the object adjacent in the other traffic stream as an object which is directly in front thereof and furthermore to control the traveling speed of each object in relation to the traveling speed of the object which was detected directly therebefore. Thus one can proceed in this manner as if, of two tracks or trails, each is occupied in a zone in front of the confluence point with all objects which are provided in this zone on both tracks/trails. With such a mode of operation, the individual objects can pass the confluence point without stopping.

The purpose of the invention is to develop such a method by using especially attenuated electrical lines of the type also above described. For this purpose, the invention provides, in an arrangement of the type mentioned above, that there extends along each track or trail of the object comprising the traffic stream and which are equipped with transmitters and receivers, and arranged parallel to one another, at least two (specially) attenuated, homogeneous, electrical conductors, of which one (the first conductor) has associated therewith for each object of the traffic stream at least one transmitter and one receiver and one (the second conductor) has associated therewith for each such object only one receiver, and that connections are provided between the first conductor of each track or trail and the second conductor of the other track or trail (lengthwise) at regular distances. The latter may be galvanic connections at such small distances from one another that a coupling of a signal into a first conductor at any desired point thereon equals substantially a direct coupling of this signal at the corresponding (oppositely positioned) point in the conductor connected to said (first) conductor.

In such an arrangement a signal which is coupled from a transmitter of an object into the first conductor of a track or trail will extend not only in this conductor but also in the second conductor of the other track or trail, which second conductor is connected to said first-named conductor. Since the amplitude of the signal decreases in both conductors to the same degree, that is according to an exponential law with negative exponents, this signal can determine both the distance between the transmitting object and an object which follows it on the same track or trail and also the distance between the transmitting object and an object which follows it on the other track or trail. If transmitters which send out signals of a defined amplitude and receivers of a defined sensitivity are herein used, preferably transmitters and receivers, whose transmitting output or sensitivity depends on the speed of the associated object and thus are variable in a defined manner, then each object receives — during receiving of a signal from an object which precedes on the same track or trail and/or from an object which precedes on the other (adjacent) track or trail, a signal which depends on its speed, on the speed of the transmitting object and on the distance between both objects. This signal is thus capable of controlling the operating pattern of the receiving object in such a manner as to prevent same from running against the transmitting object.

If thus the transmitting and the (following) receiving object are on separate tracks, the receiving object can act in such a manner as if the transmitting object were directly in front of it on the same track and can adjust its operating procedure appropriately to that of the transmitting object. Thus two objects which are provided on separate tracks will never simultaneously reach the confluence point as long as all objects continuously send and receive such signals. Thus, each object can pass the confluence point without colliding with another thereof.

In order to exclude in the described arrangement the possibility that the signal of the transmitter of an object may influence a signal which is relayed to same from a transmitter of an object which precedes on the same or the other track, there needs to be arranged for each object between each transmitter and the receiver associated with the same conductor only one compensating-transmitter.

BRIEF DESCRIPTION OF THE DRAWING

Exemplary embodiments of the invention and further features which are defined in the subclaims will be discussed more in detail hereinafter in connection with the drawings. The drawings illustrate schematically in FIG. 1, in a plan view, vehicles on two separate tracks which end in a third track along with electric conductors which extend along the tracks, FIG. 2, in a cross-sectional view, one of the conductors of FIG. 1 in connection with a coil which has two U-shaped iron cores, FIG. 3 in a perspective view, a section of one of the conductors of FIGS. 1 and 2, FIG. 4, the tracks of FIG. 1, partially broken, and connections between the conductors, FIG. 5, the tracks of FIG. 1, partially broken, with data transmitters which are connected between the conductors, FIG. 6, the tracks of FIG. 1, with electrical conductors of the type illustrated in FIGS. 2 and 3, of which one is divided into individual sections for each track, FIG. 7, a continuous line of one track with a divided conductor of the other track as shown in FIG. 6 and data transmitters which are connected therebetween and FIG. 8, a block circuit diagram of a device for the right-of-way regulation between vehicles of separate tracks which have the same distance from a meeting point or area.

DETAILED DESCRIPTION

Figure 1:
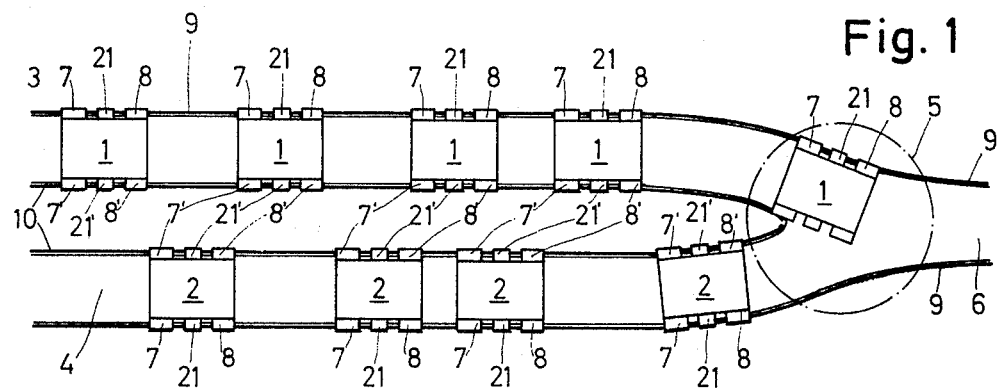

The vehicles 1 and 2 shown in FIG. 1 are for example so-called individual means of communication in a short-distance traffic system which are intended to communicate without stopping and automatically between a departure point and a destination. Passing operations between the vehicles 1 or 2 are in such a system not possible and hence for this purpose a track guide in connection with a rail or the like can be provided for the vehicles. The vehicles 1 and 2 are on two separate tracks 3 or 4 and must be joined in a confluence zone 5 marked by a circle onto a third track 6. They move thus without stopping in the direction of this confluence zone 5 which they are intended to pass. This is only possible in the case of the illustrated vehicle sequence if between the vehicles 1 or 2, depending on the accumulation of vehicles, gaps are created which in the confluence zone 5 if desired can be occupied interchangeably by one vehicle of the vehicles 2 or the vehicles 1. Thus the confluence zone may always be reached by only one vehicle of track 3 or of track 4 if none is intended to stop. Such a gap is provided according to FIG. 1, however, only between the first two vehicles 1 of the left track 3 to receive the first vehicle 2 of the right track 4. How further such gaps can be created between the remaining vehicles 1 or 2 in any desired vehicle sequence will be described more in detail hereinafter:

According to FIG. 1 all vehicles 1 and 2 are equipped on their longitudinal sides with transmitters 7, 7' and receivers which are coupled (inductively) with electrical conductors 9 or 10 extending along the respective tracks 3 or 4 of the vehicles. The transmitters 7 and 7' may be conventional generators for producing a high-frequency alternating current, for example transistor-generators which are each connected to a coil. The receivers 8 and 8' can each consist of a common transistor-amplifier and a coil connected therewith.

The coils which are associated with the transmitters 7, 7' receivers 8, 8' have the same structure, with the possible exception of the number of their windings. This structure can be seen in FIG. 2, wherein there is schematically illustrated only one coil 11 in connection with one (9) of the aforementioned conductors. The winding 12 of said coil is symmetrically distributed on two U-shaped iron cores 14 having the same dimensions, which iron cores define air gaps 13 and are arranged symmetrically with respect to the conductor 9 projecting through the air gaps in a longitudinal direction. With the chosen construction of the coil 11, the magnetic leakage in comparison to the useful flux is small in the air gaps 13 or in the iron cores 14. Further, the magnetic flux is homogenized in the air gaps. In this manner a maximum efficiency is achieved for the transmitters 7 and 7', and a minimum sensitivity for the receivers 8 and 8' against magnetic stray fields.

Figure 2:
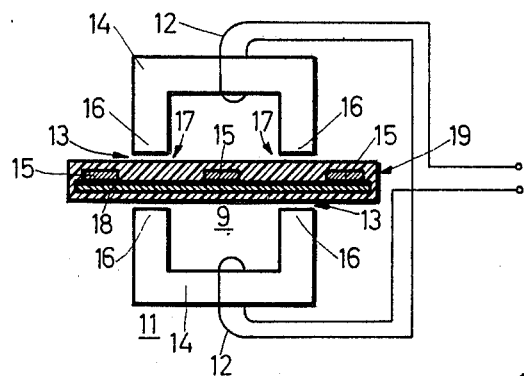

As can be further seen from FIG. 2, the conductor 9 consists of three parallel conductor strips 15 which are arranged in one plane and of which the two outer ones are spaced equally from the central conductor strip. This symmetrical conductor 9 has compared with a common double conductor a substantially higher safety against interference. Since it is possible that the vehicles 1, 2 and thus the respective coil 11 may during their travel move laterally relative to the conductor 9, the width of the pole shoes 16 of the iron cores 14 is less than the spacing between the outer and the central conductor strip 15 of the conductor, the width of such spacing being thus greater than that of one of the iron cores. In this construction both conductor loops 17 are also equally permeated by magnetic flux during lateral shifting of the coil 11 relative to the conductor 9. Rubbing of the conductor 9 on the pole shoes 16, may be due to lifting of the vehicles 1 and 2, can be prevented by suitably large air gaps 13. Such movements in the aforedescribed construction of the coil 11 (windings 12 being symmetrically distributed on two iron cores 14) have no effect on the coupling to the conductor. Further details will be found in U.S. Pat. No. 3,836,770.

Figure 3:
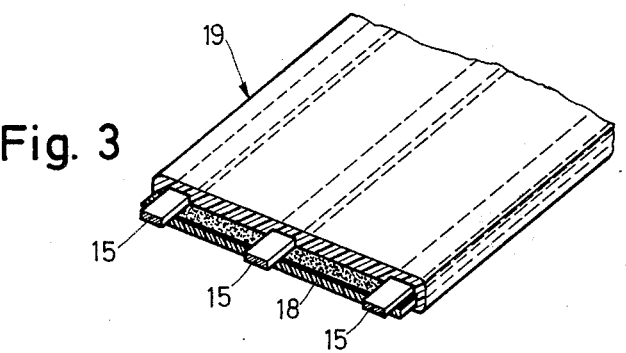

All conductors 9 and 10 illustrated in FIG. 1 are constructed in the aforedescribed manner. As particularly shown in FIG. 3, the individual conductor strips 15 (flat strips of copper or the like) of the respective conductor are embedded together with a conducting foil 18, for example a carbon-coated plastic fleece, in a jacket 19 of plastic, whereby the strips 15 are conductively connected to one another over their entire length by the foil. The conductivity of this cross-connection is substantially less than the one of the conductor strips 15. This results in a strong ohmic cross leakage of the conductor, which cross leakage in connection with the series impedance of the conductor results in a strong attenuation of the conductor. Further details will be found in U.S. Pat. No. 3,809,803.

In such a especially attenuated, homogeneous conductor (FIGS. 2 and 3) the amplitude of a signal which is supplied by a transmitter 7 or 7' decreases measurably in a short line section (for example of a length of one meter), namely according to an exponential law with negative exponent. The amplitude of the signal at any desired point is thus a measure of the distance between this point and the respective transmitter 7 or 7'. Accordingly, for example, the last one of the vehicles 1 (FIG. 1) can be informed constantly as to its distance from the next to the last, namely, the directly preceding vehicle 1, through its receiver 8, as long as its transmitter 7 feeds a signal of defined amplitude (high-frequency alternating current) into the attenuated conductor 9. The same is true for the second to the last vehicle 1 in relation to the respective preceding vehicle, as well as for each vehicle 2 on the second track 4.

Since information as to the respective distance between two vehicles 1 or 2, particularly at extremely small distances, is alone not sufficient to prevent a running of one vehicle into a preceding one, it is provided also that the transmitting power of the transmitters 7, 7' and the sensitivity of the receivers 8, 8' are variable with the speed of each respective vehicle. The transmitting power of each transmitter 7 and 7' is at a maximum when the respective vehicle 1 or 2 is standing and is at a minimum when same is at a maximum speed. However, the sensitivity of each receiver 8 or 8' during both standstill of the vehicle is at a minimum and at a maximum at maximum speed. For this purpose the transmitters and receivers 7, 7' or 8, 8' per vehicle can be controlled by common means by means of a voltage, such as a voltage from a generator drive by a wheel of the vehicle.

Thus, for example, as long as all transmitters 7 transmit a signal, each of the vehicles 1 and 2 (for the driving and braking control) receives information which depends on its own speed, on the speed of the respective preceding "transmitting" vehicle and on the distance between both vehicles. This information is thus suitable to control the driving pattern of the respective "receiving" vehicle in such a manner as to prevent any vehicle from running into the respective "transmitting" vehicle. This information thus needs at the "receiving" vehicle only to be fed to a governor-which is associated with the (not illustrated) vehicle drive-as reference input and there combined with the aforementioned control voltage (then controlled condition) in a manner that any exceeding of the reference input (by the controlled condition) results automatically in a braking of the vehicle. An exceeding of the reference input is thus always a sign that the "receiving" vehicle has a higher speed than the preceding "transmitting" vehicle and/or the distance between both is insufficient in view of the speed difference.

Figure 4:
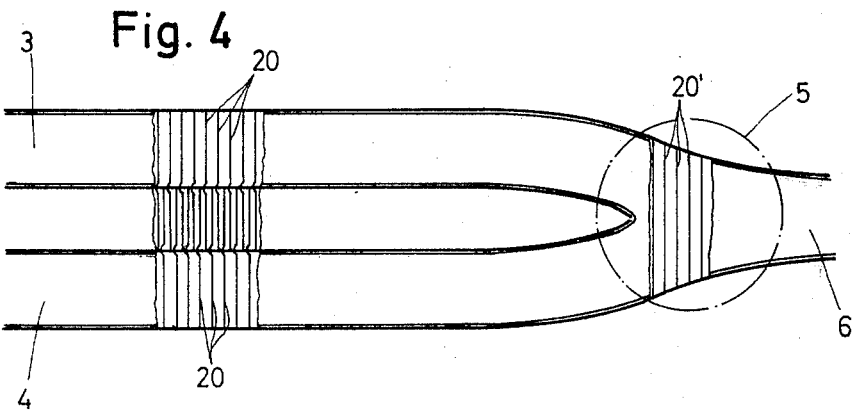

In the aforedescribed arrangement thus the operating pattern of each individual vehicle is determined by the operating pattern of the directly preceding vehicle, namely in the case of each track 3, 4 and 6 by using the transmitters and receivers 7 or 8 or the vehicle 1 or 2 in connection with the respectively associated attenuated conductor 9. The further (second) attenuated conductors 10 according to FIG. 1, which conductors are associated with the tracks 3 and 4, fulfill on the other hand in connection with the receivers 8' of the vehicles 1 and 2 a function of additionally being able to determine the operating pattern of the individual vehicle from the operating pattern of a vehicle which precedes on a different track. For this purpose galvanic connections 20 exist at regular distances between the first conductor 9 of the left track 3 and the second conductor 10 of the right track 4 and between the second conductor of the left track 3 and the first conductor of the right track 4, which is illustrated in FIG. 4 only for a short section of the tracks 3 and 4. These connections are provided at short intervals (for example, a few centimeters) one behind the other so that a coupling of a signal into a first conductor 9 at any desired point corresponds substantially to a direct coupling of this signal at the corresponding (opposite) point into the second conductor 10 connected to said conductor 9. Thus, for example, a signal which is coupled by the transmitter 7 of the second to the last vehicle 1 of the left track 3 into the first conductor 9 of said track is received both by the receiver 8 of the last vehicle 1 of the left track and also by the receiver 8' of the last vehicle 2 of the right track 4, whereby the signal is at the point of such receiver 8', according to its amplitude and phase position, substantially equal to the signal which would be received by the receiver 8 of a vehicle (1) which is provided in the position of the last vehicle 2 on the left track 4. Thus the last vehicle 2 of the right track 4 will behave in the same manner as though it were the second to the last vehicle 1 of the left track 3. Since no sufficient distance exists between these two vehicles 1 and 2, thus the second to the last vehicle 1 cannot pass through the confluence zone 5 without hindrance by the last one of the vehicles 2, same is decelerated automatically (in accordance with the received signal). A similar situation exists for all remaining vehicles which have insufficient distance from the respectively preceding vehicle on the adjacent track. Each of the vehicles 1 and 2 will behave in the same manner as if there were directly in front of it the vehicle 2 or 1 which is actually the directly preceding vehicle on the other track 4 or 3. Accordingly, sufficient spacings are created between the vehicles 1 or 2 that always one, and preferably only one, vehicle 1 or 2 can pass through the confluence zone 5.

Since the spreading of one signal of a transmitter 7 (only these transmitters are activated as the vehicles 1 and 2 move in the direction of the confluence zone 5) occurs in the first and second lines 9 or 10 symmetrically in both directions, which includes the driving direction of the vehicles 1 and 2, this signal can in some instances alter a signal which was sent to the receiver 8 of the respective "transmitting" vehicle. To exclude such influences, for example, of a signal which was sent to the receiver 8 of the last one of the vehicles 1 through the signal of the transmitter 7 of said vehicle 1, there is arranged for each vehicle 1 and 2 between each transmitter 7 (7') and the receiver 8 (8') associated with the same conductor 9 (or 10), a compensating-transmitter 21 (or 21'). Of the compensating transmitters 21 and 21', whose structure corresponds substantially to that of the aforedescribed transmitters 7 and 7', only the ones which are associated with the transmitters 7 are in operation during the travel of the vehicles 1 and 2 in direction of the confluence zone 5. Each compensating-transmitter 21 transmits a signal, the amplitude of which corresponds to that of the signal of the transmitter 7 of the same vehicle at the location of the compensating-transmitter and the phase position of which is shifted 180° with respect to said signal at this same location. This results in the signal of the transmitter 7 being cancelled substantially at the place of the compensating-transmitter 21 without substantially influencing the spreading of this signal in the respective conductor 9 in the direction of a following vehicle. Since each compensating-transmitter 21 produces a signal, not only in the respective first conductor 9 but also in the second conductor 10 which is associated with said first conductor, it is basically impossible that a signal of a transmitter 7 should spread substantially beyond the place of an associated compensating-transmitter 21 in a conductor 9 or 10.

As can further be seen from FIG. 4, there are also provided the galvanic connections 20' in the confluence zone 5 between the two first conductors 9. Because of this, it is there also impossible for a vehicle drive to drive onto a preceding vehicle. Because a vehicle which passes through the confluence zone 5 can also there relay signals to a following vehicle. Behind the confluence zone signals are relayed advantageously only through one of the conductors 9 to the track 6 between the vehicles 1 and 2, whereby in all vehicles either the transmitters and receivers 7, 21 or 8 of the left or the ones (7', 21' or 8') of the right vehicle sides are in operation. Thus, it is here possible to completely leave out the one conductor 9.

It is here noted that (like in FIG. 4) no illustration is given of the vehicles 1 and 2 according to FIG. 1 in the following-described arrangements because of the illustration of the connections between the lines 9 and 10.

Figure 5:
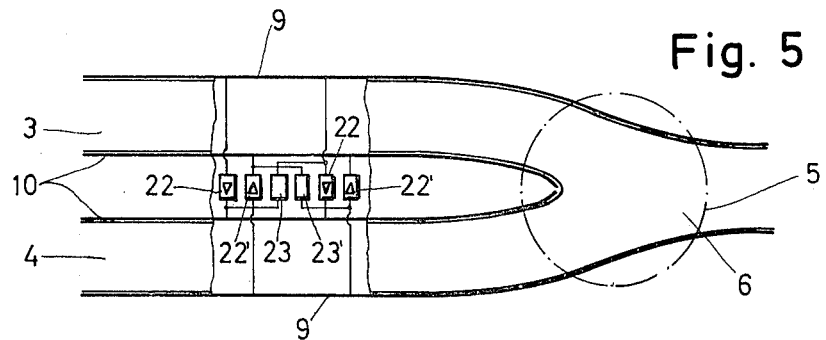

The arrangement according to FIG. 5 differs from the one according to FIG. 4 in that between the first conductors 9 and the associated second conductor 10 connections are provided with the interpositioning of each one amplifier 22 or 22' (for example, common transistor amplifiers). In this manner, it is possible to minimize connections as compared with the arrangement according to FIG. 4. It is only necessary to provide between a first and second line 9 or 10 connections at such intervals which are smaller than the smallest possible center distances between two directly successive vehicles. This assures also that at a minimum distance between to vehicles on separate tracks, the leading vehicle can still relay signals to the next following one. The amplifiers 22 and 22' are advantageously operated at high negative feedback with the amplification factor of "1" so that, as far as amplitude and phase are concerned, the same signals are available at the amplifier outputs which are each connected with a second conductor 10 as at the relevant inputs which are each connected with a first conductor 9. With this arrangement (FIG. 4), a coupling of a signal into the first conductor 9 at the location of an amplifier 22 or 22' thus equals a direct coupling of this signal at a corresponding point into the second conductor 10, same being thus connected to said first line through the amplifier. It is thus provided that the signal which is transmitted by an amplifier 22 or 22' can spread only limitedly in the respective second conductor 10 in the direction of travel of the vehicle, namely only to the closest amplifier 22 or 22' associated with the same conductor. This is achieved in the case of the amplifiers 22 or 22' associated with the same conductors, by coupling each thereof in antiphase with the amplifier which lies closest in direction of travel of the vehicles through a simulation 23 or 23' of that section of the respective second conductor which extends between both amplifiers. Of the two amplifiers 22 which are illustrated in FIG. 5 the one which lies closer (the right one) to the confluence zone 5 will compensate the signal which is provided at its feed point in the second conductor 10, when the other (the left) amplifier 22 feeds a signal thereinto. Also in the arrangement according to FIG. 5, connections will advantageously exist in the confluence zone 5 between the two first conductors 9, preferably also with the interpositioning of amplifiers.

Figure 6:
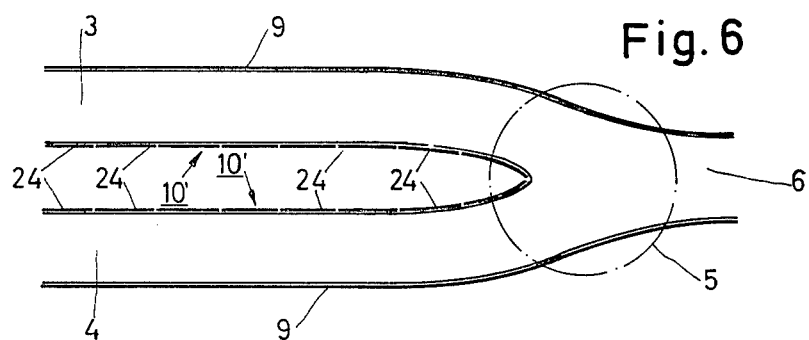
Figure 7:
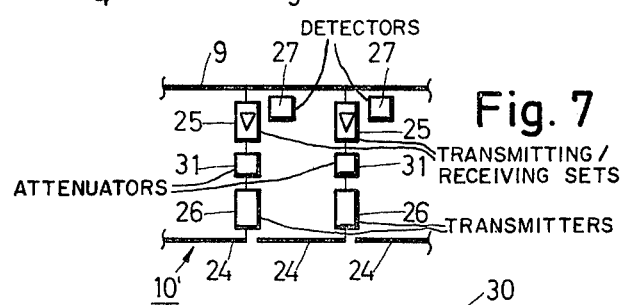

Compared with this, in the arrangement according to FIG. 6 the second conductors 10' are divided each into sections 24 of one length which corresponds approximately to the distance between a transmitter 7, 7' and the receiver 8 or 8' of a vehicle 1 or 2, which receiver is associated with the same conductor 9 or 10'. Each section 24 has at its end facing away from the direction of travel of the vehicles 1 or 2 a (not illustrated) terminating impedance which equals the characteristic impedance of the respective conductor 10'. This terminating impedance can for example be for each conductor section 24 a network of a coil and an ohmic resistor, which on the one side is conductively connected with the central conductor strip and on the other side is conductively connected to the two outer ones of the conductor strips 15 (FIG. 3) of the respective conductor section. Furthermore each conductor section 24 is connected by its other end, facing the direction of travel of the vehicles, through a transmitting/receiving set 25 and a transmitter 26 to the associated first conductor 9. This is illustrated in FIG. 7 in connection with one section of the first conductor 9 of the left track 3 and in connection with conductor sections 24 of the right track 4, which conductor sections 24 are associated with said conductor. Thus, in the arrangement according to FIG. 6, there is in the same manner the first conductor 9 of the right track 4 associated with the conductor sections 24 of the left track 3. As transmitting/receiving sets 25 common transistor-amplifiers can be used; as transmitters 26 transistor-generators of an already known type can be used. In such an arrangement with a continuous first conductor 9 and a (second) conductor 10' divided into conductor sections 24, coupling of a signal into the first conductor at the place of a transmitting/receiving set 25 is the same as a direct coupling of this signal at the respective end of the associated conductor section 24. The signal, or its amplitude which is created by the transmitter 26 connected following said transmitting/receiving set 25, decreases in the corresponding conductor section 24 in the same manner as the amplitude of the signal in the first conductor 9. The signal in the conductor section 24 has at the termination (impedance) of the same, and accordingly at the end of the conductor section facing away from the direction of travel (of the vehicle), the same value as the signal (produced according to the signal in the first conductor 9) at the beginning of the closest conductor section, that at its end facing the direction of travel. Thus level steps do not exist between two conductor sections 24.

Figure 8:
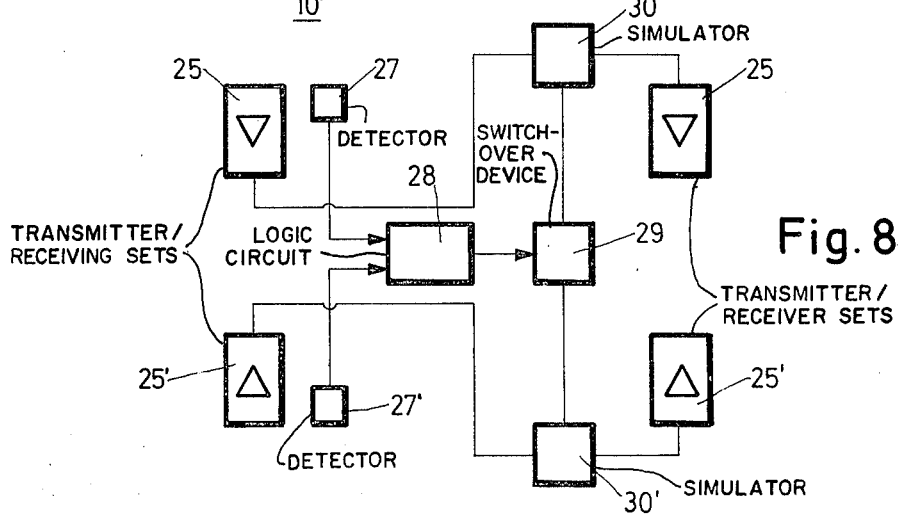

According to FIG. 7, further, a detector 27 is associated with each transmitting/receiving set 25. In this example, so-called inductive sensors are used. Each detector 27 is arranged on the respective track (3 or 4) in such a manner that it always reacts or supplies a signal when a transmitter of a vehicle 1 or 2 passes the associated transmitting/receiving set 25. Furthermore each detector 27 of the left track 3, together with a detector of the right track 4, which detector has the same distance from the confluence zone 5, is connected to a logic circuitry 28. This is illustrated in FIG. 8, wherein there the detector of the right track is characterized with reference numeral 27' and the transmitting/receiving sets belonging to said track are characterized with reference numeral 25'. The circuitry 28 is a common circuit for connecting two patterns in a manner that signals transmitted from both detectors 27 and 27' simultaneously effect the formation of a (control) signal corresponding to one of these signals and signals transmitted from both detectors successively create a (control) signal corresponding to the first existing signal.

A switching-over device 29 is connected to follow the circuitry 28, which switching-over device couples, depending on the received control signal, either the transmitting/receiving set 25 which is associated with the detector 27 (of the left track 3) or the transmitting/receiving set 25' which is associated with the detector 27' (of the right track 4) to the transmitting/receiving set 25 or 25' which is the closest in direction of travel (of the vehicles) by interpositioning a simulation 30 and 30', respective of a conductor section 24. These simulations 30 and 30' are each constructed in such a manner that they amplify a signal which is transmitted from a transmitting/receiving set 25 or 25' to the respectively (in direction of travel) closest transmitting/receiving set 25 or 25' by a factor which is proportional to the attenuation of the conductor section (between both transmitting/receiving sets or between the associated transmitters 26 which are not illustrated in FIG. 8).

Accordingly, for example, the signal of a transmitter 7 of one vehicle 1 of the left track 3 can be coupled — during passing of a transmitting/receiving set 25 — into the conductor section 24 (of the right track 4), which conductor section is associated with said transmitting/receiving set 25, and simultaneously into the conductor section which is provided (in direction of the confluence zone 5) directly in front thereof. A here provided "receiving" vehicle (2) is then stopped, and the "transmitting" vehicle 1 receives the right of way. This is always of importance if the two vehicles are very close to or substantially adjacent each other on the separate tracks. Thus according to the aforedescribed operation of the logic circuitry 28, one of two vehicles 1 and 2 always gets the right of way, such being the one whose transmitter 7 first passes the respective detector 27 or 27' (according to FIG. 8). If the transmitters 7 of both vehicles 1 and 2 pass simultaneously, the respective detector 27 or 27' then arbitrarily, but yet clearly, gives the right of way to one vehicle 1 or 2. It is here noted that each transmitting/receiving set 25 and 25' for example can be coupled in the aforedescribed manner also with the transmitting/receiving set 25 or 25' of the vehicle which in direction of travel is the next but one, or it can be coupled solely to same.

As can additionally be taken from FIG. 7, further devices, namely attenuators 31, are connected between the transmitting/receiving sets 25 and the associated transmitters 26. It is thus provided that the attenuation of the individual attenuators 31 becomes progressively greater with an increasing distance of the same from the confluence zone 5. Thus the left one of the attenuators 31 according to FIG. 7 has an attenuation which is greater at a certain factor than the right one, the attenuation of which is again greater at the same factor than the one of the (not illustrated) next attenuator. Thus always one signal of a transmitter 7 of a vehicle is attenuated during the transmission from the first conductor 9 to the second conductor 10', and is the more so the further this "transmitting" vehicle is away from the confluence zone 5. This has the advantage that the traveling pattern of the vehicles 1 and 2 (which are not illustrated in FIG. 6) is adjusted at the beginning of the second conductors 10' not suddenly but slowly to the traveling pattern of the vehicle 2 or 1 which is ahead on the adjacent track 4 or 3. In this manner, emergency stops are avoided if for example two vehicles 1 and 2 simultaneously reach the respective starting point of the second conductor 10'. In order to avoid, in such an attenuated transmission of signals between a continuous conductor 9 and a conductor 10' which is divided into sections 24, signal steps on transition from one conductor section to the next, the attenuation of the individual conductor sections need to be greater only by an amount which depends on the relationship of the attenuation of two adjacent attenuating members 31 than the attenuation of the first conductor 9.

It is in addition noted that for example in the arrangements illustrated in FIGS. 4 and 5, each one transformer can be connected into the connections between the conductors 9 and 10 in order to protect the entire system from interfering potentials. Furthermore it is possible in the arrangement according to FIG. 7 to drop all transmitters 26 and instead to carry out in a time multiplex a scanning of all transmitting/receiving sets 25 which are arranged on the first conductor 9 and the feeding of all conductor sections 24 of the associated second conductor 10' through a common device with a rotating selector switch. Finally the aforedescribed device for the right-of-way regulation can according to FIG. 8 also be constructed by common means in such a manner that a logic circuitry receives signals in dependency on the traveling speeds of the vehicles. For this circuitry advantageously a construction is then chosen in order to be able to transmit control signals to a switching-over device, in order that of two equally positioned or very closely successively traveling vehicles on separate tracks, the faster one (advantageously only at a large difference between both traveling speeds) always receives the right of way. Of two vehicles which are provided on separate tracks in associated track sections, the vehicle which arrives there later will receive the right of way if its traveling speed is higher than the traveling speed of the vehicle which arrived there earlier.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In an arrangement for merging moving objects travelling in single file along respective ones of at least a pair of paths toward a confluence point at which the paths merge, said arrangement including control means mounted on each of said objects for controlling the speed of each object and spacing the objects, said control means comprising signal transmitting means and signal receiving means on each object, a signal transmitted by said signal transmitting means in one object on one path being received by said signal receiving means in the next object on said path, the improvement comprising:

stationary signal transmission line means extending coextensively with each of said paths prior to said confluence point, said signal transmission line means comprising electrical signal transmitting conductor means and first electrical connection means for effecting a higher than normal attenuation of said electrical signal in a longitudinal direction along said electrical signal transmitting conductor means so that the amplitude of said electrical signal transmitted over said electrical signal transmitting conductor means will be diminished in said longitudinal direction;

coupling means for coupling said signal transmitting means and said signal receiving means on each of said objects to said signal transmission line means so that signals can be transmitted from said signal transmitting means on one object to said signal receiving means on the next object; and second electrical connection means for connecting said signal transmission line means adjacent one of said paths prior to said confluence point to said signal transmission line means adjacent the other of said paths also prior to said confluence point whereby a signal transmitted by said signal transmitting means on the forwardmost one of said objects on one of said paths will be transmitted through said second electrical connection means to said signal receiving means on the next following object on the other of said paths.

2. The improvement according to claim 1, wherein said signal transmission line means includes a pair of signal transmission lines, one on each side of each of said paths;

wherein said signal transmitting means includes at least one signal transmitter coupled by said coupling means to one of said signal transmission lines on one side of said path;

wherein said signal receiving means includes a pair of signal receivers, one signal receiver being coupled by said coupling means to said one of said transmission lines and the other of said signal receivers being coupled by said coupling means to the other of said transmission lines on the other side of said path so that said one signal transmitter and said one signal receiver are associated with said one transmission line and said other signal receiver is associated with said other transmission line; and wherein said second electrical connection means comprises a first electrical connection between said one of said transmission lines on the corresponding said one sides of each of said paths and a second electrical connection between the other of said transmission lines on the corresponding said other sides of each of said paths.

3. The improvement according to claim 2, wherein said control means includes means defining a compensating transmitter mounted between said signal transmitter and said one signal receiver.

4. The improvement according to claim 2, wherein said second electrical connection means include a plurality of said first and second electrical connections spaced longitudinally along both of said paths.

5. The improvement according to claim 4, wherein said plurality of said first and second electrical connections are spaced from one another a distance less than the smallest distance between the centers of two successive objects.

6. The improvement according to claim 5, wherein said first and second electrical connections include electrical amplifier means.

7. The improvement according to claim 6, wherein one of said electrical amplifier means in one of said first and second connections is coupled in antiphase with at least one amplifier means located between said one amplifier means and said confluence point.

8. The improvement according to claim 7, wherein said one amplifier means is located in the next adjacent electrical connection.

9. The improvement according to claim 8, wherein said antiphase connection is through simulation means for that section of the transmission line which extends between the two amplifiers.

10. The improvement according to claim 2, wherein the transmission lines on the insides of said pair of paths are divided into sections, the length of which corresponds approximately to the distance between said signal transmitter and said one signal receiver on a common object; and wherein the end of the section which is directed away from the travelling direction of the object terminates in a characteristic impedance of the respective transmission line, the opposite end of said section being connected to a stationary transmitter and a transmitting/receiving set which are connected between the transmission line on the opposite side of the respective path and said opposite end.

11. The improvement according to claim 10, wherein a detector is positioned adjacent said transmitting/receiving set and issues a signal whenever said signal transmitter on an object passes said transmitting/receiving set.

12. The improvement according to claim 11, wherein two of said detectors are positioned at equal distances from said confluence point and are connected to logic circuitry which controls switch-over means, logic circuitry signals simultaneously relayed by both of said detectors being deciphered so that only one signal is produced to control which of said objects is controlled.

13. The improvement according to claim 12, including a plurality of transmitting/receiving sets spaced longitudinally along said paths, said transmitting/receiving sets being connected in a direction corresponding to the direction of movement of said objects through simulation means for simulating the length of one of said sections, said simulation means being adapted to amplify a signal travelling in a direction corresponding to the direction of movement of said object by a factor which is proportional to the attenuation of the respective section.

14. The improvement according to claim 10, wherein said stationary transmitter and said transmitting/receiving set are series connected and has means defining an attenuating member connected in circuit therebetween.

15. The improvement according to claim 14, wherein the magnitude of attenuation by said attenuating member is increased with increasing distance from said confluence point.

16. The improvement according to claim 14, wherein the magnitude of attenuation by individual sections is greater than the attenuation of the transmission line on the opposite side of said path therefrom, the difference in attenuation depending on the relationship of the attenuation of a pair of adjacent attenuator members.

* * * * *